United States Patent Office 3,090,940
Patented May 21, 1963

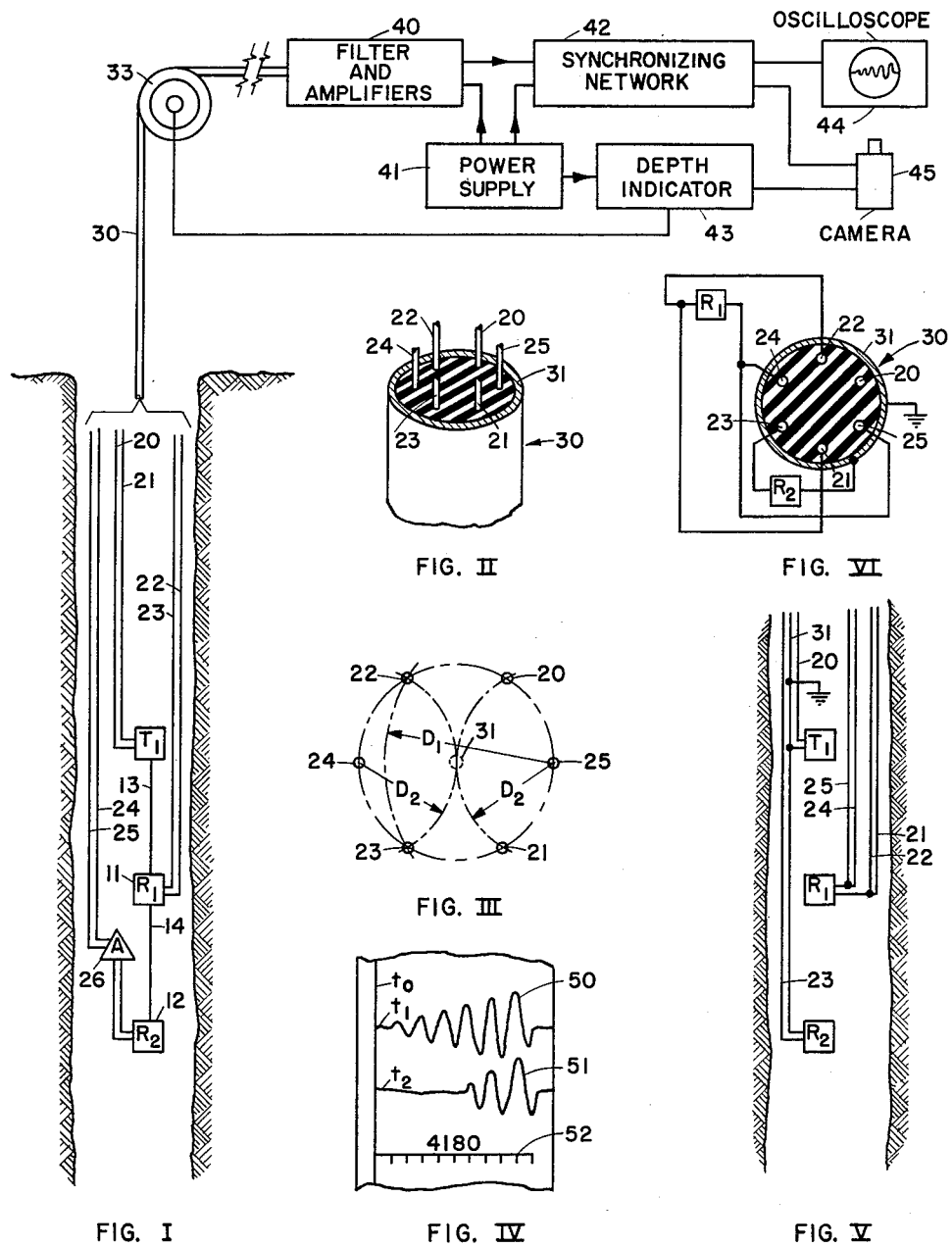

3,090,940
WELL LOGGING
Charles B. Vogel, Houston, Tex., assignor to Shell Oil Company, a corporation of Delaware
Filed June 27, 1958, Ser. No. 745,118
4 Claims. (Cl. 340—18)

This invention pertains to the logging of earth formations traversed by a borehole, and relates more particularly to logging methods in which it is desired to simultaneously transmit separate electric signals from a logging device in a borehole to recording units at the surface of the ground over a single multi-conductor cable.

In practicing such methods, the logging device is lowered into the borehole at the end of a cable which is usually electrically connected, at the surface of the ground, to a suitable power source and to units for recording signals transmitted over the cable from the logging device.

When the cable simultaneously carries at least two separate measurement signals, or where at least a portion of the transmission of two signals overlap, there is often considerable mixing or cross coupling between the signals as they are transmitted up the cable, and thus, at the surface, the recorder may display spurious readings and the records may be undecipherable. The amount of mixing or cross coupling is particularly objectionable when the cable is more than about one mile in length and the measurement signals are characterized by fluctuations having a frequency of more than about 1,000 cycles per second. In normal communication circuits cross coupling between separate signals transmitted over a multiconductor cable is reduced by twisting together the individual conductors of each given pair of conductors. However, this is not a practical solution for the problem in well logging cables because such cables are used to support the weight of the down hole instruments as well as being used for raising and lowering the instruments in the borehole. This loading on the cable tends to stretch the cable which would result in the crushing of the insulation between the twisted conductors. In addition, in most logging equipment the cable is passed over a measuring sheave as it is lowered into the borehole thus adding to the loading of the cable and the crushing of the insulation.

Past attempts to overcome the cross coupling problem in well logging cables have generally relied on a complex instrumentation circuitry which was designed to avoid rather than solve the problem by preventing the simultaneous transmission of separate signals, for example, by delaying the transmission of the later signal or by cutting off the transmission of the first signal before the transmission of the later signal. In some cases, the logging devices included circuitry for separating intermingled signals carried by a common pair of conductors on the basis of, for example, their amplitudes or frequencies. Of course, in all logging equipment it is desirable to have the down hole equipment as simple as possible inasmuch as it receives considerable abuse during the lowering and raising operations.

Accordingly, an object of this invention is to provide a new and improved method and apparatus for substantially reducing the intermingling or cross coupling between separate signals which overlap for a portion of the transmission or are simultaneously transmitted over a multi-conductor cable from a logging device.

Another object of this invention is to provide a unique multi-conductor cable for simultaneously transmitting separate electrical signals in which the individual signal conductors are disposed to reduce cross coupling between the conductors to a minimum.

A still further object of this invention is to provide a novel multi-conductor cable for simultaneously transmitting separate electrical signals, the individual signal conductors being disposed in one pair having substantially equal impedances with respect to the individual conductors of a second pair, the second pair of conductors having different impedances with respect to the individual conductors of the first pair.

A still further object of this invention is to provide a multi-conductor cable which is capable of simultaneously transmitting electrical signals generated by well logging instruments with a novel means for connecting the instruments to the cable which substantially reduces cross coupling between the individual conductors.

The above objects and other advantages of this invention are obtained by providing a method of connecting two or more receivers of a down hole well logging instrument to a multi-conductor cable in a manner to substantially reduce the intermingling of the signals from the two receivers when they are transmitted simultaneously over the cable. The normal well logging cable consists of six conductors which are dispersed in a hexagonal arrangement within the cable and an armored sheath surrounding the outside of the cable. This invention attains its results by utilizing pairs of conductors for transmitting the signals, each conductor of one pair being equally spaced from both of the conductors of the other pair to give a balanced relationship between the pairs of conductors. This balanced relationship may also be obtained by utilizing a pair of conductors, each of which have substantially equal impedance between themselves and every other conductor in the cable and a second pair of conductors which have unequal impedances between themselves and every other conductor in the cable.

The term balanced relationship refers to separate pairs of conductors which are disposed within a multi-conductor cable in a pattern to reduce to a minimum the intermingling and cross coupling of signals when the signals are transmitted simultaneously over the cable. A balanced relationship can be achieved by utilizing the proper conductors of an existing multi-conductor cable to form the pairs or constructing a special cable as will be more fully explained below.

These objects and further advantages of this invention will be more easily understood from the following detailed description of two preferred embodiments when taken in conjunction with the attached drawings in which:

FIG. I illustrates a schematic arrangement of a well logging device constructed according to this invention;

FIG. II is a perspective view of the cable shown in FIG. I drawn to an enlarged scale;

FIG. III is a schematic cross section of the cable shown in FIG. II;

FIG. IV is a sectiton of a seismogram recorded by the well logging unit shown in FIG. I;

FIG. V is a schematic drawing illustrating a second embodiment of this invention; and FIG. VI is a cross section of the cable shown in FIG. V drawn to an enlarged scale.

The two embodiments of this invention are described in detail as applied to an acoustical type well logging instrument such as those illustrated in Patent 2,708,485. In an acoustical type well logging instrument an acoustical signal is generated by means of a transmitter with the impulse being reeceived by at least one receiver which is spaced along the vertical axis on the transmitter. The receiver receives the impulse after it has traveled through the rock formation surrounding the well and converts it to a fluctuating high frequency voltage signal which is transmitted to the surface where the signal is recorded in the form of a seismogram. While it is possible to employ only one receiver, superior results are obtained when two or more receivers are used since the two readings may then be averaged to obtain a more accurate indication of the velocity of the sound waves through the formations surrounding the borehole. When two or more receivers are used, the problem of intermingling or cross coupling of the separate signals become more serious.

When two or more receivers are used in a velocity well logger the signal mixing problem is particularly important. Normally, a sharp, down hole sonic pulse does not cause just one, or even a few closely spaced, large pressure waves to strike a down hole receiver. Rather, it has been found that the pulse causes a series of pressure waves having a decay period well in excess of the time period required for a pressure wave to reach each receiver in succession. Also, the first pressure waves to reach either receiver are usually small in comparison to the waves that follow. Thus, the first receiver which is effected by the pressure waves transmits a signal of increased intensity at the time when the second receiver is initially affected by the smaller first pressure waves to produce a signal of a lesser intensity. The arrival of the later waves is believed to be due to elastic vibrations of the fluid in the borehole, the echoing of waves within the wall of the borehole and the like. The signal indicating the time of arrival of the initial pressure wave at the receiver closest to the transmitter which has fired is clear and distinct since this signal is transmitted over the cable to the recording units at the surface of the ground before a response from the other receiver is initiated, and thus, there is no cross coupling or signal interference or intermixing. However, if the construction of the cable is such that signal mixing can occur when separate signals are simultaneously transmitted over separate pairs of cable conductors, the continuing transmission of a signal over one pair of conductors from the closest or first receiver can transfer so large a signal to the pair of conductors connected to the second receiver that the signal indicating the arrival of a pressure wave at the second receiver cannot be recognized from the records taken at the surface of the ground.

Referring now to FIG. I there is shown a schematic arrangement in which a transmitter 10 ($T_1$) generates an acoustical impulse which is transmitted downwardly through the borehole and outwardly through the rock formation surrounding the borehole. The transmitter $T_1$ may be of any desired construction, for example, the type in which capacitors are charged and then discharged through suitable electrodes to generate an acoustical impulse such as more fully described in the above referred to patent. Spaced below the transmitter $T_1$ are two receivers 11 ($R_1$) and 12 ($R_2$). The two receivers are connected to the transmitter $T_1$ by means of suitable connections 13 and 14. The connections 13 and 14 should be of sufficient rigidity to maintain the desired spacing between the transmitter and receivers $R_1$ and $R_2$ and in addition should possess some flexibility so that the complete instrument may be lowered past the irregularities in the borehole. The receivers $R_1$ and $R_2$ may be of any desired design which is capable of receiving the acoustical waves generated by the acoustical impulse and converting them into a high frequency electrical signal. A suitable receiver design is disclosed in the above patent. The transmitter $T_1$ is connected to the power supply located on the surface by means of two conductors 20 and 21 while the receiver $R_1$ is connected to the surface units by means of two conductors 22 and 23. The receiver $R_2$ is connected to a preamplifier 26 whose output in turn is connected to the surface units by means of conductors 24 and 25. The conductors 20 to 25 all form part of a multi-conductor cable 30 which is used both to transmit the signals to the surface units and to lower and raise the instruments in the borehole. The cable 30 is passed over a measuring sheave 33 which measures the length of cable lowered into the borehole and thus gives an indication of the depth at which the instruments are located. The sheave 33 is connected to a Selsyn unit whose output signal is connected to a depth indicator 43. The cable 30 is connected to a filter and amplifying unit 40 which in turn is connected to synchronizing network 42 with all of the units being supplied with power from a suitable power supply 41. The synchronizing network 42 is connected to an oscilloscope 44 which is preferably of a dual beam type so that the signal generated by both receivers may be viewed concurrently. The synchronizing network and depth indicator are also connected to a camera 45 so that the camera will record the traces appearing on the oscilloscope after both receiver signals have appeared and record the depth indicator at the same time.

Referring to FIGS. II and III there is shown the arrangement of the conductors 20 to 25 in the cable 30, drawn to an enlarged scale. As explained above the signal from the receiver $R_1$ is connected to conductors 22 and 23 while the signal from the receiver $R_2$ is connected to the conductors 24 and 25. The armored sheath 31 of the cable is shown in FIG. III at the center of the diagram. This is a true representation inasmuch as the sheath is located an equal distance from all of the conductors of the cable and thus its effective center is at the center of the cable. As seen in FIG. III the conductor 24 is located a distance $D_2$ from both conductors 22 and 23 while the conductor 25 is located an equal distance $D_1$ from both conductors 22 and 23. Thus, the conductors 22, 23 and 24, 25 are in a balanced relationship with each other and the other pair of conductors 20, 21 is also in a balanced relationship with respect to conductors 24 and 25. When the conductors 22, 23 are used to transmit the signal from receiver $R_1$ and the conductors 24, 25 are used to transmit the signals from receiver $R_2$ the cross coupling between the two conductors will be less than one-sixteenth the amount that occurs when the signals are transmitted in the normal manner employing conductors 22 and 24 to transmit one signal and 21, 23 to transmit the other signal. This fact is borne out by actual measurements in which a signal was fed into one pair of conductors at one end of the cable and then the signals appearing across this pair of conductors and the pair in balanced relationship with this pair were measured at the other end of the cable. When the conductors of each pair were chosen in accordance with the balanced relationship described above the ratio of $R_2$ to $R_1$ was .03, where $R_1$ represents the signal received over the conductor pair through which the signal was transmitted and $R_2$ represents the signal received over the conductor pair in balanced relationship with the first. By contrast the ratio was on the order of .5 when the conductor pairs were chosen in the normal manner.

FIG. IV illustrates a film recording of tracings appearing on the oscilloscope 44. The trace 50 in FIG. IV corresponds to the signal generated by the receiver $R_1$ while the trace 51 corresponds to the signal generated by receiver $R_2$. The line 52 at the bottom of the figure is an indication of uniform time intervals from which the arrival of the various waves may be determined while the No. 4180 is an indication of the depth of the instruments in the borehole. The line $T_0$ indicates the generation of the acoustical impulse while the point $T_1$ on trace 50 indicates the point of arrival of the first acoustical waves at the receiver $R_2$ and the point $T_2$ on trace 51 indicates the arrival of the first waves at the receiver $R_2$. The interpretation of such a seismogram is more fully explained and discussed in the patent referred to above.

While the above described embodiment utilizes an amplifier 26 to amplify the signals from receiver $R_2$ the same results could be obtained by placing a shunt across the conductors 22 and 23 to reduce the amplitude of the signal transmitted by the receiver $R_1$. Of course, in some instances, neither amplification nor shunting will be necessary since the amplitude of the two signals will be substantially equal, although normally when two receivers are used the one closest to the transmitter generates a signal of greater amplitude than the receiver farthest removed from the transmitter.

Also, it should be noted that while the invention has been described as relating to a particular acoustical well logging device, it could be equally well applied to other types of well logging such as resistance or capacitance logging. In both resistance and capacitance logging of a well, a high frequency electrical signal is generated by the down hole instruments which must be transmitted to surface instruments. When two such signals are transmitted simultaneously or overlap during a portion of their transmission, intermingling or cross coupling will occur. Thus, the method of selecting conductors disclosed above will be advantageous in reducing the amount of intermingling or cross coupling.

FIGS. V and VI illustrate a second embodiment of this invention in which one pair of conductors is chosen so as to have substantially equal impedance between each other and every other conductor in the cable. In order to accomplish this result, the transmitter is supplied with power by means of the conductor 20 and the grounded sheath 31 of the cable. The signal from the receiver $R_1$ is transmitted to the surface by means of one conductor formed from a pair of conductors 21 and 22 and a second conductor formed from a pair of conductors 24 and 25. The signal from the receiver $R_2$ is transmitted to the surface over a pair of conductors consisting of the conductor 23 and the grounded sheath 31. When this arrangement is used, it will, of course, be necessary to filter the signal received from the receiver $R_2$ in order to separate it from the power signal supplied to the transmitter $T_1$. This can be easily accomplished due to the fact that the frequency of the power supply is considerably lower than the frequency of the signals generated by the receivers $R_1$ and $R_2$.

As seen in FIG. VI, the conductors 21 and 22 are located diametrically opposite each other in the cable while the conductors 24 and 25 in addition to being adjacent to the conductors 21 and 22 are also diametrically opposite each other. Thus assuming a uniform dielectric constant for the insulating material of the cable, the impedance existing between these pairs of conductors will be substantially equal over the entire length of the cable. Furthermore, each pair of conductors 21, 22 and 24, 25 will have equal impedance with respect to the conductors 20, 23 due to their physical position in the cable. The same will be true with regards to their impedance with respect to the grounded sheath of the cable since its effective center is at the center of the cable. While the pair of conductors 21, 22 and 24, 25 have equal impedance between themselves and every other conductor in the cable the same is not true of the conductors 20 and 23. Each of the conductors are closer to both the effective center of the grounded sheath and to the conductor pairs 21, 22 and 24, 25 than they are to each other, thus the impedance between themselves and every other conductor in the cable is not equal.

When the above described arrangement of conductors is used to obtain conductor pairs to transmit signals from receivers $R_1$ and $R_2$ it results in a balanced relationship between the conductors. The ratio of cross coupling or intermingling of signals between the conductor pairs 21, 22 and 24, 25 and the conductor pair 23 and 31 when conductor pairs 21, 22 and 24, 25 was used to transmit the signal was approximately .03, while it was only .003 when the conductor pair 23, 31 was used to transmit the signal.

This difference in the cross coupling depending on which pair of conductors is used to transmit the signal can be easily understood by comparing the conductors to the corners of a bridge with the insulation serving as the legs of the bridge. In the first case all the legs of the bridge were substantially equal since the conductor pairs 21, 22 and 24, 25 had equal impedance between themselves and every other conductor in the cable, while in the second case two of the legs had less impedance than the other two legs since conductor pair 23, 31 does not have equal impedance with every other conductor in the cable. In the second case although the impedance between the conductor pair 23, 31 and the other conductors is not equal, they are very nearly equal to the values required to balance the bridge. Under this condition of a balance bridge but unequal legs, the transmission through the bridge depends on which legs of the bridge are fed. The pair which produces the smallest cross coupling can be used to transmit the weakest signal in those cases where the signals are of unequal magnitude.

The above embodiment thus provides another method for obtaining a balanced relationship between two pairs of conductors in order that two signals may be transmitted simultaneously over a multi-conductor cable with a minimum of cross coupling or intermingling of the signals. This embodiment also provides a pair of conductors having very low cross coupling, which pair may be utilized to transmit the weakest signal.

While but two specific embodiments by which two separate pairs of conductors having a balanced relationship to each other have been described in detail this invention is susceptible to many other embodiments within its broad spirit and scope.

I claim as my invention:

1. An apparatus for seismic velocity borehole logging comprising: a first and second receiver vertically spaced along said borehole; transmitter means for producing an acoustical impulse at a point vertically spaced from said first and second receivers; circuit means connecting both said transmitter means to a power supply located at the surface and said first and second receivers to a recording means located on the surface, said circuit means including a multi-conductor cable, a first pair of conductors of said cable being connected to said first receiver, a second pair of conductors of said cable being connected to said second receiver, a third pair of conductors of said cable being connected to said transmitter, said first pair of conductors being disposed in both a balance and substantially parallel untwisted relationship with respect to said second pair of conductors and said third pair of conductors being disposed in both a balanced and substantially parallel untwisted relationship with respect to said first and second pair of conductors.

2. An apparatus for simultaneously transmitting at least a portion of at least two individual electrical signals over a single multi-conductor cable comprising: a multi-conductor cable having six individual conductors disposed in a hexagonal spacing; all said individual conductors being disposed in a substantially parallel untwisted relationship; a first transmission circuit formed by a first pair of diametrically opposed conductors in said cable; a second transmission circuit formed by a second pair of conductors in said cable, said second pair of conductors being located on the corners of the hexagon adjacent one of the conductors of the first pair; one of said signals being transmitted over the first circuit and the other of said signals being transmitted over the second circuit.

3. An apparatus for simultaneously transmitting at least a portion of at least two individual electrical signals over a single multi-conductor cable having an outer conducting sheath comprising: a multi-conductor cable having six individual conductors disposed in a hexagonal spacing, all said individual conductors being disposed in a substantially parallel untwisted relationship; a first transmission circuit formed by a first pair of conductors, each conductor of the first pair being formed by a pair of diametrically opposed conductors of the cable; a second transmission circuit formed by one of the remaining conductors of the cable and the sheath of the cable.

4. The apparatus of claim 3 having a third transmission circuit formed by the remaining pair of conductors located on the corners of the hexagon adjacent the other conductor of the first pair.

References Cited in the file of this patent

UNITED STATES PATENTS

| | | |
|---|---|---|
| 1,008,423 | McIntyre | Nov. 14, 1911 |
| 1,625,125 | Latour | Apr. 19, 1927 |
| 2,233,992 | Wyckoff | Mar. 4, 1941 |
| 2,708,485 | Vogel | May 17, 1955 |

FOREIGN PATENTS

| | | |
|---|---|---|
| 450,124 | France | Jan. 10, 1913 |